J. S. COXEY.
AEROPLANE LEVEL INDICATOR.
APPLICATION FILED JULY 25, 1918.

1,361,367.

Patented Dec. 7, 1920.
2 SHEETS—SHEET 1.

INVENTOR
JASPER S. COXEY
BY
ATTORNEY

UNITED STATES PATENT OFFICE.

JASPER S. COXEY, OF ABERDEEN, WASHINGTON.

AEROPLANE LEVEL-INDICATOR.

1,361,367.

Specification of Letters Patent.  Patented Dec. 7, 1920.

Application filed July 25, 1918. Serial No. 247,460.

*To all whom it may concern:*

Be it known that I, JASPER S. COXEY, a citizen of the United States, residing at Aberdeen, in the county of Grays Harbor and State of Washington, have invented a new and useful Improvement in Aeroplane Level-Indicators, of which the following is a specification.

This invention relates to new and useful improvements in aeroplane level indicators for indicating to the pilot thereof the degree of inclination the machine may be from the horizontal or vertical plane, and the object of this improvement is to provide a device that is simple in the design of its construction and positive in its degree of accuracy.

A further object resides in the combination of two indicating means visible to the pilot of the machine whereby he can determine at a glance the degree of inclination the machine is tilted from the horizontal or vertical plane.

Further objects will appear from the following specification, illustrated in the accompanying drawings, and finally pointed out in the appended claim.

Figure 1:
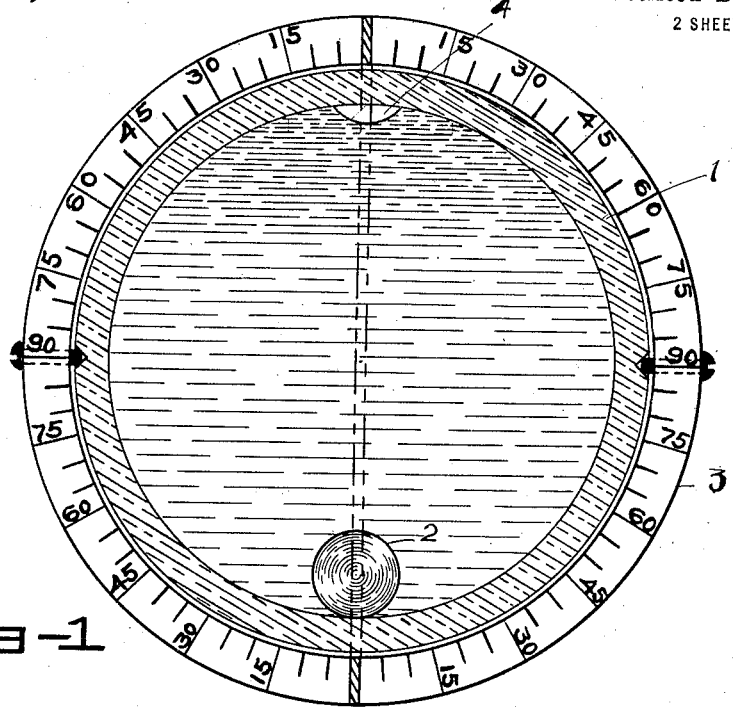
Figure 2:
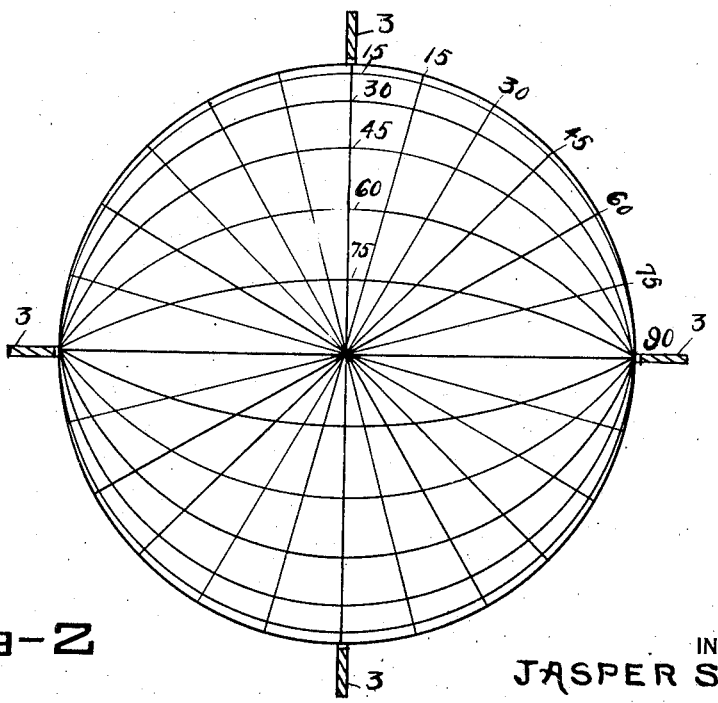
Figure 3:
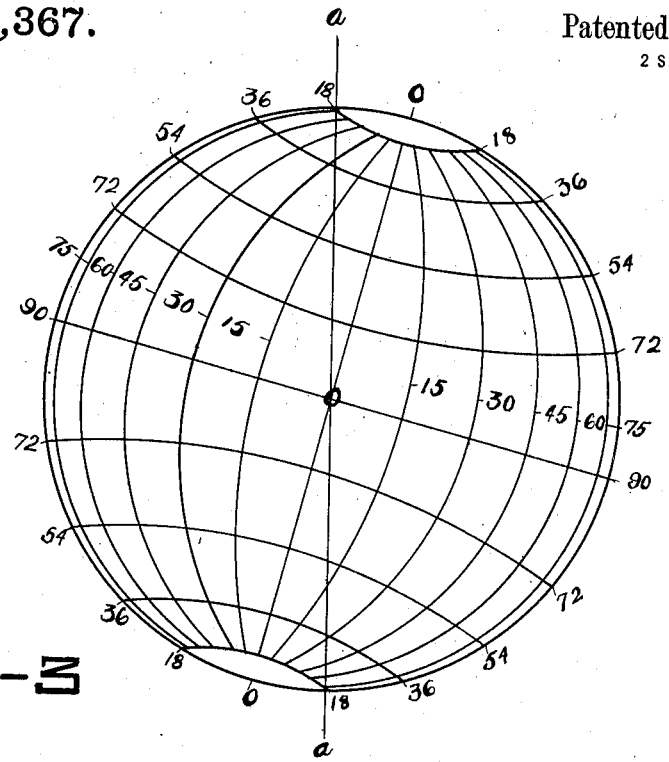
Figure 4:
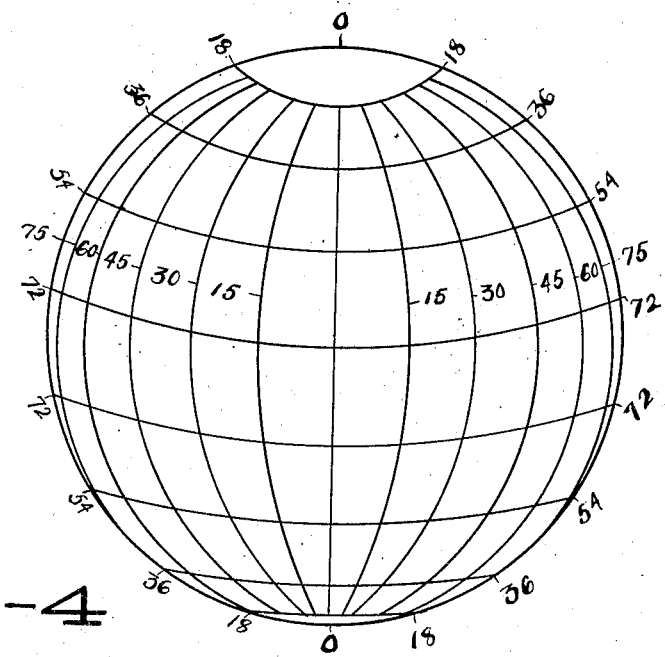

In the drawings, Figure 1 is a sectional elevation of a sphere which constitutes the form of my device; Fig. 2 is a plan of the spherically shaped device embodying the design of marking the area off into sections; Fig. 3 is an alternative plan of marking the area off into sections, showing the sphere at an inclination from the vertical; and Fig. 4 is a plan of the same in vertical position.

Referring more particularly to the drawings, in which like reference numerals indicate like parts, the numeral 1 indicates a spherically shaped receptacle, in the form of a globe, within which is disposed liquid preferably of non-freezing properties, and 2 is a spherically shaped ball of such composition as will not effect a discoloration of the liquid as to render the glass of which the sphere is constructed opaque, and thereby conceal from vision the position of the ball 2 and the air bubble 4.

3 are bands of any suitable material placed around the outer periphery of the sphere and dividing it into four equal sections, and upon both sides of the bands are spaces indicating degrees by numerals 15, 30, 45, 60, 75 and 90 from the center of gravity at the vertical to the horizontal plane. These bands can be graduated in degrees of any denomination from zero to 90 degrees.

It is thus obvious that the pilot can note the position of either the air bubble 4 or ball 2 with respect to the center of gravity of the device, and by glancing at the scale of the section the bubble or ball is visible within, can instantly ascertain the degree of inclination the machine is tilted from the vertical or horizontal plane; as, for instance, should the machine be flying at an ascent of 15 degrees, with an inclination of 30 degrees from the horizontal plane to either left or right, or whether the machine is descending at the same corresponding inclinations, the bubble or ball would be directly under the particular section indicated by the degree number upon the band 3.

In Figs. 3 and 4 is shown an alternative means of indicating the degrees of variation from the horizontal or vertical plane. In place of the bands 3 being placed around the periphery of the sphere, and having indicated thereon the degrees from the center of gravity at the vertical to the horizontal plane, the sphere is laid out in sections and the degrees are indicated upon each section line, the section lines being laid out in meridian and parallel lines like the globe, the parallel lines being marked in degrees from 90 at the equator to both poles, the parallel lines on both sides of the equator being marked respectively in degrees 72, 54, 36 and 18, and the meridian lines being marked in degrees from the axis, zero, on both sides respectively 15, 30, 45, 60, 75 and 90.

It is obvious that an aeroplane equipped with a device of this character would be of especial value to the pilot of an aeroplane at night time when his vision of the earth is obscured by darkness or foggy weather.

It is further obvious that a device of this character would be particularly advantageous to new and inexperienced pilots in indicating to them mechanically the angle inclination of their machine with respect to the horizontal plane, and thereby enable them to avert many accidents until they have become more experienced and have reached a degree of efficiency and instinctively develop a sense of balance.

Having thus described my invention, what I claim as new, and desire to protect by Letters Patent, is:—

In combination, a hollow transparent body of spherical form filled with liquid to form an air bubble, a ball of relatively small diameter adapted to roll freely within the liquid to maintain itself at the lowest point within the sphere and diametrically opposite the bubble, and circumferential bands placed about the outer periphery of the spherical body in planes at right angles to each other and having indicia thereon forming a scale for determining the deflection of the ball and bubble within the body.

Signed by me at Seattle, Washington, this 3d day of May, 1918.

JASPER S. COXEY.

Witnesses:
E. B. HERALD,
D. C. KUHNS.